US009437364B2

(12) United States Patent
Kamiura et al.

(10) Patent No.: US 9,437,364 B2
(45) Date of Patent: Sep. 6, 2016

(54) FILM CAPACITOR

(71) Applicant: PANASONIC CORPORATION, Osaka (JP)

(72) Inventors: Ryosuke Kamiura, Osaka (JP); Hiroki Takeoka, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 199 days.

(21) Appl. No.: 14/344,287

(22) PCT Filed: Oct. 18, 2012

(86) PCT No.: PCT/JP2012/006658
§ 371 (c)(1),
(2) Date: Mar. 11, 2014

(87) PCT Pub. No.: WO2013/069211
PCT Pub. Date: May 16, 2013

(65) Prior Publication Data
US 2014/0355174 A1 Dec. 4, 2014

(30) Foreign Application Priority Data

Nov. 11, 2011 (JP) ................................. 2011-247169
Apr. 4, 2012 (JP) ................................. 2012-085398

(51) Int. Cl.
*H01G 4/015* (2006.01)
*H01G 4/012* (2006.01)
(Continued)

(52) U.S. Cl.
CPC ................ *H01G 4/008* (2013.01); *H01G 4/01* (2013.01); *H01G 4/012* (2013.01); *H01G 4/015* (2013.01); *H01G 4/18* (2013.01); *H01G 4/248* (2013.01); *H01G 4/32* (2013.01); *Y02T 10/7022* (2013.01)

(58) Field of Classification Search
USPC .............................. 361/273, 301.5, 304, 323
See application file for complete search history.

(56) References Cited

U.S. PATENT DOCUMENTS 4,305,111 A    12/1981   Forster
5,019,418 A     5/1991   Linzey et al.
(Continued)

FOREIGN PATENT DOCUMENTS

JP     61-208821 A    9/1986
JP     62-036624 B2    8/1987
(Continued)

OTHER PUBLICATIONS

International Search Report issued in PCT/JP2012/006658, dated Nov. 13, 2012, with English translation, 2 pages.
(Continued)

*Primary Examiner* — Eric Thomas
(74) *Attorney, Agent, or Firm* — McDermott Will & Emery LLP

(57) ABSTRACT

A film capacitor includes a capacitor element including a dielectric film and a pair of electrode layers facing each other across the dielectric film, and a pair of end-surface electrodes provided on both ends of the capacitor element. At least one electrode layer of the pair of electrode layers mainly contains aluminum and further contains zinc and magnesium. A peak of an atomic concentration of magnesium of the electrode layer is located at a position closer to a surface of the electrode layer than a peak of an atomic concentration of zinc of the electrode layer. The film capacitor has a high humidity resistance.

9 Claims, 5 Drawing Sheets

(51) Int. Cl.
  *H01G 4/008* (2006.01)
  *H01G 4/18* (2006.01)
  *H01G 4/01* (2006.01)
  *H01G 4/248* (2006.01)
  *H01G 4/32* (2006.01)

(56) References Cited

U.S. PATENT DOCUMENTS

| | | | | |
|---|---|---|---|---|
| 5,625,527 | A * | 4/1997 | Hatada | C23C 14/20 |
| | | | | 361/273 |
| 6,222,721 | B1 * | 4/2001 | Vetter | H01G 4/012 |
| | | | | 361/273 |
| 6,370,008 | B1 * | 4/2002 | Vetter | H01G 4/015 |
| | | | | 361/273 |
| 2006/0050467 | A1 * | 3/2006 | Shiota | H01G 2/16 |
| | | | | 361/303 |
| 2012/0218679 | A1 | 8/2012 | Takeoka et al. | |
| 2014/0009865 | A1 | 1/2014 | Takeoka et al. | |
| 2014/0355174 | A1 * | 12/2014 | Kamiura | H01G 4/012 |
| | | | | 361/305 |
| 2014/0376154 | A1 | 12/2014 | Takeoka et al. | |

FOREIGN PATENT DOCUMENTS

| | | |
|---|---|---|
| JP | 09-326328 A | 12/1997 |
| JP | 2009-206296 A | 9/2009 |
| JP | 2011-208246 | 10/2011 |
| WO | 2011-055517 A1 | 5/2011 |

OTHER PUBLICATIONS

The partial supplementary European Search Report dated Nov. 5, 2015 for the related European Patent Application No. 12847409.5.

* cited by examiner

FILM CAPACITOR

RELATED APPLICATIONS

This application is the U.S. National Phase under 35 U.S.C. §371 of International Application No. PCT/JP2012/006658, filed on Oct. 18, 2012, which in turn claims the benefit of Japanese Application No. 2011-247169, filed on Nov. 11, 2011 and Japanese Application No. 2012-085398, filed on Apr. 4, 2012, the disclosures of which Applications are incorporated by reference herein.

TECHNICAL FIELD

The invention relates to a film capacitor used for various electronic devices, electrical apparatus, industrial equipment and automobile, appropriately used for smoothing, filtering and snubbering in an inverter circuit for a drive motor of a hybrid vehicle.

BACKGROUND ART

FIG. 7 is a schematic cross-sectional view of conventional film capacitor 100. Film capacitor 100 includes a capacitor element and end-surface electrodes 104 and 105 which are formed at both ends of the capacitor element. The capacitor element includes dielectric film 101, positive electrode layer 102, and negative electrode layer 103. Positive electrode layer 102 faces negative electrode layer 103 across dielectric film 101.

Electrode layers 102 and 103 are made of aluminum vapor-deposited on dielectric film 101. Ends of electrode layers 102 and 103 are connected to end-surface electrodes 104 and 105, respectively.

End-surface electrodes 104 and 105 are made of zinc and formed by spraying zinc.

Layers made of zinc are provided at surfaces of electrode layers 102 and 103 at ends 106 and 107 of electrode layers 102 and 103 connected to end-surface electrodes 104 and 105, respectively. This structure connects end-surface electrodes 104 and 105 firmly to electrode layers 102 and 103, respectively, while reducing tan δ of film capacitor 100.

A conventional film capacitor similar to film capacitor 100 is disclosed in Patent Literature 1.

When the layers of zinc are formed at ends 106 and 107 of electrode layers 102 and 103, zinc may spread entirely on electrode layers 102 and 103. For instance, the layers of zinc may hardly be vapor-deposited locally onto ends 106 and 107, and particles of zinc spread entirely onto electrode layers 102 and 103. Zinc is easily corroded, and facilitates oxidation of electrode layers 102 and 103, thereby reducing a humidity resistance of film capacitor 100.

CITATION LIST

Patent Literature

Patent Literature 1: Japanese Patent Laid-Open Publication No. 2009-206296.

SUMMARY

A film capacitor includes a capacitor element including a dielectric film and a pair of electrode layers facing each other across the dielectric film, and a pair of end-surface electrodes provided on both ends of the capacitor element. At least one certain electrode layer of the pair of electrode layers mainly contains aluminum and further contains zinc and magnesium. A peak of an atomic concentration of magnesium of the certain electrode layer is located at a position closer to a surface of the certain electrode layer than a peak of an atomic concentration of zinc of the certain electrode layer.

The film capacitor has a high humidity resistance.

DETAILED DESCRIPTION OF PREFERRED EMBODIMENT

Figure 1:
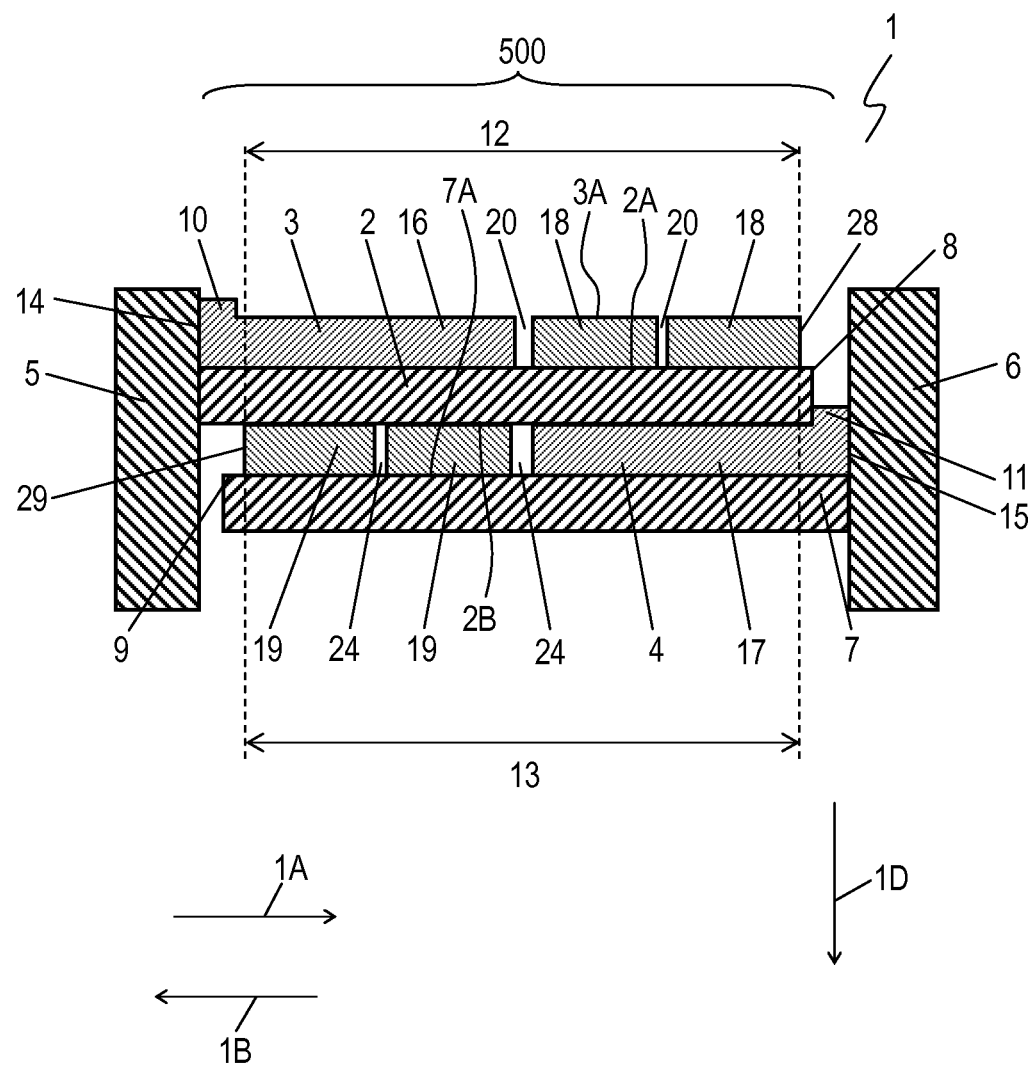
FIG. 1 is a cross sectional view of a film capacitor according to an exemplary embodiment.

FIG. 1 is a cross-sectional view of film capacitor 1 according to an exemplary embodiment. Film capacitor 1 is a metallized film capacitor including capacitor element 500 and end-surface electrodes 5 and 6 provided at both ends of capacitor element 500. Capacitor element 500 includes dielectric film 2 and electrode layers 3 and 4 facing each other across dielectric film 2. Electrode layer 3 is configured to have a higher voltage applied thereto than electrode layer 4 is. Thus, electrode layer 3 functions as a positive electrode while electrode layer 4 functions as a negative electrode. Hereinafter, electrode layer 3 functioning as the positive electrode is referred to as positive electrode layer 3 and electrode layer 4 functioning as the negative electrode is referred to as negative electrode layer 4. Positive electrode layer 3 and negative electrode layer 4 may be generally referred to as electrode layer 3 and electrode layer 4, respectively.

Figure 2:
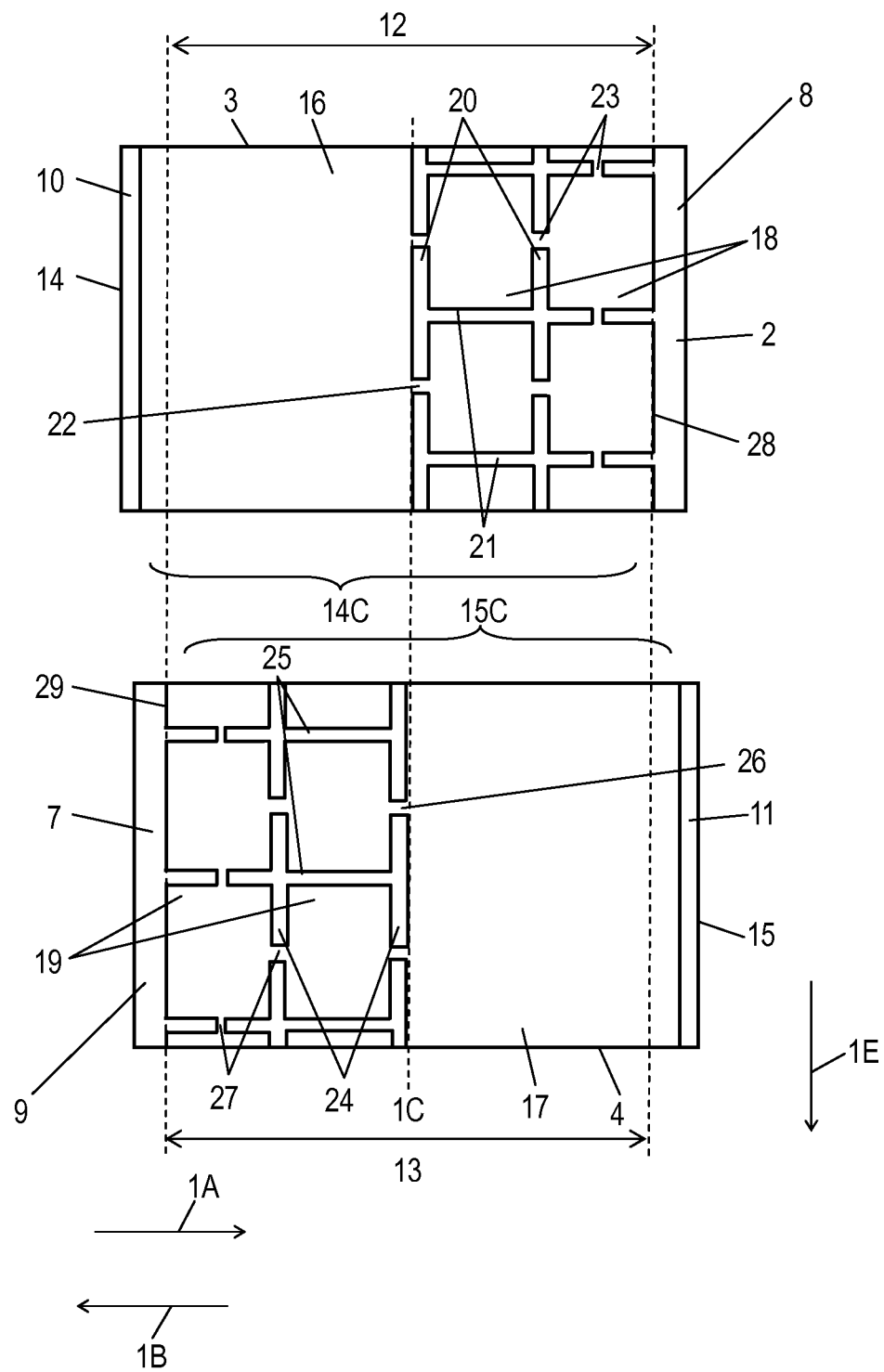
FIG. 2 is a plan view of an electrode layer of the film capacitor according to the embodiment.

FIG. 2 is a plan view of electrode layers 3 and 4. As shown in FIGS. 1 and 2, positive electrode layer 3 is formed on upper surface 2A of dielectric film 2 and negative electrode layer 4 is formed on upper surface 7A of dielectric film 7. Positive electrode layer 3 and negative electrode layer 4 face each other across dielectric film 2.

Besides the configuration shown in FIG. 1, for example, positive electrode layer 3 may be formed on upper surface 2A of dielectric film 2 and negative electrode layer 4 may be formed on lower surface 2B of dielectric film 2.

When producing capacitor element 500 of a roll-up type, positive electrode layer 3 and negative electrode layer 4 are rolled-up together with dielectric films 2 and 7, so that positive electrode layer 3 and negative electrode layer 4 face each other across dielectric films 2 and 7.

Dielectric films 2 and 7 overlap each other while deviating from each other by a distance of about 1 mm in width directions 1A and 1B so that electrode layers 3 and 4 may be drawn to outside. Positive electrode layer 3 has end 14 directed in direction 1B and has end 28 directed in direction 1A opposite to direction 1B. End 14 of positive electrode layer 3 is connected to end-surface electrode 5 but is insulated from end-surface electrode 6. Insulation margin 8 is formed at a position where positive electrode layer 3 is not formed between end 28 of positive electrode layer 3 and end-surface electrode 6. Dielectric film 2 is exposed from positive electrode layer 3 at insulation margin 8. Negative electrode layer 4 has end 15 directed in direction 1A and has end 29 directed in direction 1B. End 15 of electric layer 4 is connected to end-surface electrode 6 but is insulated from end-surface electrode 5. Insulation margin 9 is formed at a position where negative electrode layer 4 is not formed between end 29 of negative electrode layer 4 and end-surface electrode 5. Dielectric film 7 is exposed from negative electrode layer 4 at insulation margin 9. End 28 of electrode layer 3 faces end-surface electrode 6 across insulation margin 8. End 29 of electrode layer 4 faces end-surface electrode 5 across insulation margin 9.

Dielectric films 2 and 7 are made of insulating organic polymer, such as polypropylene, polyethylene terephthalate, polyethylene naphthalate, polyphenyl sulfide, or polystyrene.

Positive electrode layer 3 may be formed on upper surface 2A of dielectric film 2 by vapor deposition, and negative electrode layer 4 may be formed on upper surface 7A of dielectric film 7 by vapor deposition.

End-surface electrodes 5 and 6 are formed by spraying zinc onto ends 14 and 15 of electrode layers 3 and 4, respectively. Since zinc has a relatively low melting point, upon being sprayed, zinc may hardly cause dielectric films 2 and 7 and electrode layers 3 and 4 to deform change their nature. End-surface electrodes 5 and 6 can be formed at a low temperature at high productivity.

At least one certain electrode layer of positive electrode layer 3 and negative electrode layer 4 mainly contains aluminum and further contains zinc and magnesium. A peak of an atomic concentration of magnesium of the certain electrode layer is located at a position closer to a surface of the certain electrode layer than a peak of an atomic concentration of zinc of the certain electrode layer is.

Thus, a layer having a high concentration of magnesium is formed on a layer having a high concentration of zinc. Therefore, even if the layer of zinc is formed entirely on the electrode layer, the layer of magnesium prevents the electrode layer from having oxidative deterioration, thus enhancing a humidity resistance of film capacitor 1.

Figure 3:
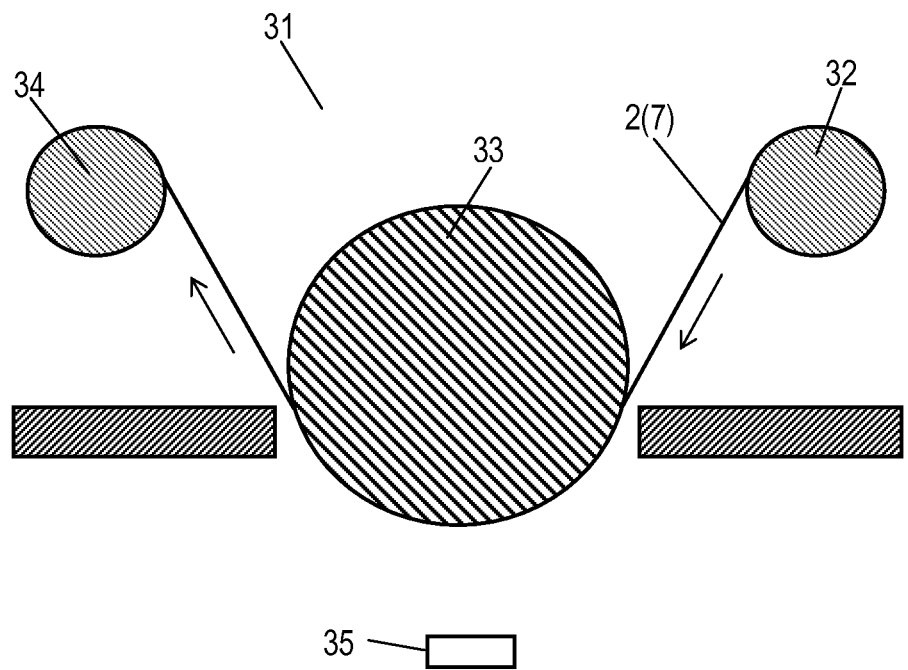
FIG. 3 is a schematic view illustrating a method of manufacturing the film capacitor according to the embodiment.

FIG. 3 is a schematic view illustrating a method of manufacturing film capacitor 1. Positive electrode layer 3 and negative electrode layer 4 are manufactured by a vapor deposition method. As shown in FIG. 3, dielectric film 2 (7) rolled on roller 32 is transferred from roller 32 while securely contacting drum 33 in vacuum vapor deposition equipment 31. While the film is rolled on roller 34, vapor-deposition material is vapor-deposited on a surface of dielectric film 2 (7) to locate the peak of the atomic concentration of magnesium at a position closer to the surface than the peak of the atomic concentration of zinc. Each vapor-deposition material, such as aluminum, zinc, and magnesium, is accommodated in melting pot 35.

EXAMPLE 1

In Example 1 of film capacitance 1, positive electrode layer 3 is formed on upper surface 2A of dielectric film 2 by vapor deposition and negative electrode layer 4 is formed on upper surface 7A of dielectric film 7 by vapor deposition.

Electrode layers 3 and 4 (positive electrode layer 3 and negative electrode layer 4) includes low-resistant portions 10 and 11 and effective electrode portions 12 and 13, respectively. Effective electrode portions 12 and 13 include ends 28 and 29 of electrode layers 3 and 4, respectively. As shown in FIGS. 1 and 2, effective electrode portion 12 of electrode layer 3 (the positive electrode layer) faces effective electrode portion 13 of electrode layer 4 (the negative electrode layer) across dielectric film 2 for forming a capacitance.

Positive electrode layer 3 as a total of low-resistant portion 10 and effective electrode portion 12 mainly contains aluminum and further contains magnesium and zinc. Negative electrode layer 4 as a total of low-resistant portion 11 and effective electrode portion 13 mainly contains aluminum and further contains magnesium and zinc.

Low-resistant portion 10 and low-resistant portion 11 are formed at a surface of positive electrode layer 3 and a surface of negative electrode layer 4, respectively, by vapor-depositing a large amount of zinc. In Example 1, low-resistant portions 10 and 11 are thicker than effective electrode portions 12 and 13.

In Example 1, low-resistant portion 10 and low-resistant portion 11 are portions of positive electrode layer 3 and negative electrode layer 4 having a resistance not higher than $5\Omega/\square$. Low-resistant portion 10 is formed in a width not larger than 2.5 mm from end 14 while low-resistant portion 11 is formed in a width not larger than 2.5 mm from end 15. The resistance is measured with Loresta GP MCP-T610, a resistivity meter made by Mitsubishi Chemical Analytech Co., Ltd. by using a constant current applied 4-terminal 4-probe method.

During a process for forming low-resistant portions 10 and 11, when zinc is vapor-deposited, the vaporized zinc particles are radially dispersed, and contained in effective electrode portions 12 and 13.

Effective electrode portion 12 of Example 1 includes large electrode portion 16 and small electrode portions 18. Effective electrode portion 13 includes large electrode portion 17 and small electrode portions 19.

As shown in FIGS. 1 and 2, longitudinal margin 20 and transverse margin 21 are formed from substantial center 1C of effective electrode portion 12 toward insulation margin 8 in width directions 1A and 1B within effective electrode portion 12 of positive electrode layer 3 for forming a capacitance. Longitudinal margin 20 and transverse margin 21 are formed at portions where electrode layer 3 is not formed to expose upper surface 2A of dielectric film 2. Longitudinal margin 20 and transverse margin 21 are insulation portions formed by transferring oil on upper surface 2A of dielectric film 2 to prevent a metal for forming electrode layer 3 from being vapor-deposited. A portion of positive electrode layer 3 extending from center 1C to end 14 connected to end-surface electrode 5 is large electrode portion 16 having no margin therein. Portions of positive electrode layer 3 arranged from center 1C to end 28 and divided by longitudinal margin 20 and transverse margin 21 are plural small electrode portions 18. Large electrode portion 16 is larger than each small electrode portion 18.

Small electrode portions 18 are electrically connected in parallel to large electrode portion 16 with fuses 22. Small electrode portions 18 adjacent to each other are connected in parallel with each other with fuses 23, as shown in FIG. 2.

Large electrode portion 16 is formed on upper surface 2A of dielectric film 2 from center 1C toward end 14, as shown in FIG. 2. Small electrode portion 18 has a width of about ¼ of width W of effective electrode portion 12 in directions 1A and 1B, and is formed within a region from center 1C toward insulation margin 8 on upper surface 2A of dielectric film 2. Two small electrode portions 18 are arranged between center 1C and insulation margin 8 in directions 1A and 1B. However, not fewer than three of the small electrode portions may be arranged along directions 1A and 1B.

In actual use, when positive electrode layer 3 and negative electrode layer 4 are short-circuited at an insulation defect part, positive electrode layer 3 around the defect part is vapored and dispersed with short-circuit energy, and recovers the insulation. Thus, even if a part between positive electrode layer 3 and negative electrode layer 4 is short-circuited, this self-healing function restores the function of film capacitor 1. If an excessively-large current flows though small electrode portions 18 due to malfunction thereof, fuse 22 or fuse 23 is dispersed to disconnect between small electrode portions 18 at the defect part, thereby recovering a normal current of film capacitor 1.

Longitudinal margin 24 and transverse margin 25 are formed from substantial center 1C of effective electrode portion 13 toward end 29 in width directions 1A and 1B within effective electrode portion 13 for forming a capacitance of negative electrode layer 4, similarly to positive electrode 3. Longitudinal margin 24 and transverse margin 25 are formed at positions where electrode layer 4 is not formed to expose upper surface 7A of dielectric film 7. Longitudinal margin 24 and transverse margin 25 are insulation portions formed by transferring oil on upper surface 7A of dielectric film 7 to prevent a metal for forming electrode layer 4 from being vapor-deposited. A portion of electrode layer 4 extending from center 1C to end 15 connected to end-surface electrode 6 is large electrode portion 17 having no margin therein. Plural portions of electrode layer 4 arranged within a region from center 1C to end 29 and divided by longitudinal margin 24 and transverse margin 25 are small electrode portions 19. Large electrode portion 17 is larger than each small electrode portion 19.

Small electrode portions 19 have the same structures as small electrode portions 18 of positive electrode layer 3 shown in FIG. 2. Small electrode portions are connected to large electrode portion 17 in parallel with fuses 26. Small electrode portions 19 are connected in parallel each other with fuses 27. Small electrode portions 19 and fuses 26 and 27 provide the same effects as those of positive electrode layer 3.

As described above, the portions of electrode layers 3 and 4 connected to end-surface electrodes 5 and 6 are large electrode portions 16 and 17, respectively. Small electrode portions 18 and 19 are located opposite to large electrode portions 16 and 17, respectively. Large electrode portion 16 is connected to end-surface electrode 5 while small electrode portions 18 are connected to large electrode portion 16 and coupled to end-surface electrode 5 via large electrode portion 16. Similarly, large electrode portion 17 is connected to end-surface electrode 6 while small electrode portions 19 are connected to large electrode portion 17 and coupled to end-surface electrode 6 via large electrode portion 17. In this configuration, a width of the electrode changes according to a current density, reducing an effective resistance of each of electrode layers 3 and 4.

Low-resistant portion 10 of positive electrode layer 3 faces end 14 where positive electrode layer 3 is connected to end-surface electrode 5. Effective electrode portion 12 faces negative electrode layer 4 across dielectric film 2 and functions as a positive electrode of film capacitor 1.

Low-resistant portion 11 of negative electrode layer 4 faces end 15 where the negative electrode layer is connected to end-surface electrode 6. Effective electrode portion 13 faces positive electrode layer 3 across dielectric film 2 and functions as a negative electrode of film capacitor 1.

Positive electrode layer 3 and negative electrode layer 4 of Example 1 mainly contain aluminum, wherein the atomic concentration of aluminum is larger than the sum of the atomic concentration of zinc and the atomic concentration of magnesium.

In Example 1, the average of the atomic concentration of aluminum in each of entire electrode layers 3 and 4 is not smaller than 50 atm %. The atomic concentration of zinc in each of entire electrode layers 3 and 4 is not smaller than 1 atm % and not larger than 40 atm %. The atomic concentration of magnesium of each of entire electrodes 3 and 4 is about not smaller than 0.5 atm % and not larger than 45 atm %.

Figure 4:
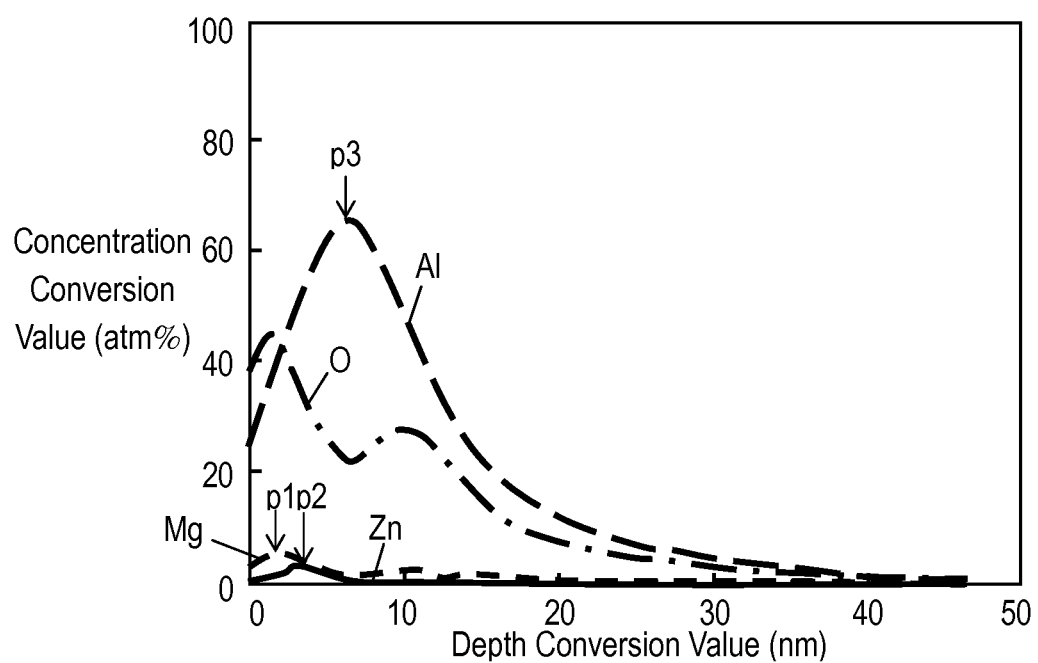
FIG. 4 shows a composition of the film capacitor according to the embodiment.

FIG. 4 shows a relation between an atomic concentration (atm %) and a conversion value (nm) of depth (distance) of each of effective electrode portions 12 and 13 of positive electrode layer 3 and negative electrode layer 4 from the surface thereof in direction 1D, obtained from analysis results of X-ray photoelectron spectroscopy (XPS). The depth conversion value is calculated by comparing a sputtering rate of silicon dioxide film and a sputtering rate of aluminum obtained under the same condition. Direction 1D is perpendicular to directions 1A and 1B and is directed from electrode layer 3 to upper surface 2A of dielectric film 2, i.e., from electrode layer 4 to upper surface 7A of dielectric film 7.

As shown in FIG. 4, peak p1 of the atomic concentration of magnesium is located at a position of a depth of about 2 nm in the conversion value. Further, O atoms are located on the surface to form an oxide film.

The value of the peak of the atomic concentration of magnesium is about 5 atm % in Example 1. The value of the peak of the atomic concentration of magnesium is preferably not smaller than 1 atm % and not larger than 45 atm %. This range increases humidity resistance of electrode layers 3 and 4. The humidity resistance will be detailed later.

Peak p2 of the atomic concentration of zinc is located at a depth of about 3 nm in the conversion value.

Peak p1 of the atomic concentration of magnesium each of electrode layers 3 and 4 is located at a position closer to the surface of each of electrode layers 3 and 4 than peak p2 of the atomic concentration of zinc of each of electrode layers 3 and 4. In direction 1D, peak p1 of the atomic concentration of magnesium of each of electrode layers 3 and 4 is located at position closer to an upper surface of each of electrode layers 3 and 4 than the atomic concentration of zinc of each of electrode layers 3 and 4.

The value of the peak of the atomic concentration of zinc is 4 atm % in Example 1. Since zinc has a low melting point and has a low humidity resistance, the value of the peak of the atomic concentration of zinc is preferably not smaller than 1 atm % and not larger than 70 atm %.

Peak p3 of the atomic concentration of aluminum is located within a range from the surface (upper surface) of each of electrode layers 3 and 4 to a depth of 6.5 nm in the conversion value. In Example 1, peaks p1 and p2 of the atomic concentration of magnesium and zinc are located at positions closer to the surface of each of electrode layers 3 and 4 than peak p3 of the atomic concentration of aluminum thereof. Namely, in direction 1D, peaks p1 and p2 of the atomic concentrations of magnesium and zinc of each of electrode layers 3 and 4 are located at positions closer to the upper surface of each of electrode layers 3 and 4 than peak p3 of the atomic concentration of aluminum of each of electrode layers 3 and 4.

The value of the peak of the atomic concentration of aluminum is about 65 atm % in Example 1. Since aluminum has a low volume resistivity and can have a small thickness, when dielectric breakdown occurs, an area of the aluminum around the position of the breakdown scatters quickly and recovers dielectric property easily (self-healing). Since electrode layers 3 and 4 made of aluminum increases a withstand voltage, the value of the peak of the atomic concentration of aluminum is preferably not smaller than 50 atm %.

In a deep portion of the electrode layer at a depth more than about 20 nm in the conversion value, the atomic concentrations of O atoms, Al atoms, Mg atoms, and Zn atoms are low. At a certain depth from the upper surfaces of electrode layers 3 and 4, not only materials of positive electrode layer 3 and negative electrode layer 4 but also a lot of material of dielectric film 2 and dielectric film 7 are detected, respectively. As the measuring point is deeper, a lot of C atoms constituting dielectric film 2 and dielectric film 7 are detected accordingly.

Comparative Sample 1 of the film capacitor is prepared. An electrode layer of Comparative Sample 1 mainly contains aluminum and further contains zinc but does not contain magnesium. In the electrode layer of Comparative Sample 1, a peak of the atomic concentration of zinc is located at a depth of about 3 nm from a surface of the electrode layer in the conversion value, similarly to Example 1. The value of the peak of the atomic concentration of zinc is 4 atm %, similar to Example 1. A peak of the atomic concentration of aluminum is located at a depth of about 6.5 nm from the surface in the conversion value, similar to Example 1. The peak of atomic concentration of zinc is located at a position closer to the surface of the electrode layer than the peak of atomic concentration of aluminum. The value of the peak of the atomic concentration of aluminum is about 65 atm %. Other configuration is identical to that of Example 1.

Table 1 shows results of comparison of a resistance (SZ/D) of electrode layers 3 and 4 and a humidity resistance of Example 1 and Comparative Sample 1. The change of the capacitance of film capacitor 1 is measured after a voltage of 500 V is continuously applied to the capacitor for 900 hours at a high temperature of 85° C. and a high humidity of 85% r.h. The smaller the change in the capacitance is, the higher the humidity resistance is.

In Table 1, a sample of Example 1 having a higher humidity resistance, that is, having a smaller capacitance change than comparative sample 1 is denoted by "+", and a sample exhibiting almost the same change is denoted by "±".

TABLE 1

| | Resistance of Electrode Layer (Ω/□) | | | | | |
|---|---|---|---|---|---|---|
| | 3 | 5 | 7 | 15 | 30 | 50 |
| Humidity Resistance of Example 1 | ± | + | + | + | + | ± |

As shown in Table 1, film capacitor 1 of Example 1 has a higher humidity resistance than comparative sample 1. Example 1 particularly having a resistance of electrode layers 3 and 4 within a range not smaller than 5Ω/□ and not larger than 30Ω/□ has a smaller capacitance change, and therefore, has a higher humidity resistance than comparative sample 1 particularly.

A reason for the above result will be described below. The increase of humidity resistance due to magnesium will be explained first. Film capacitors of Comparative Samples 2 and 3 are prepared. In Comparative Sample 2, the positive electrode layer and the negative electrode layer are both made of aluminum alone. In Comparative Sample 3, both of the positive electrode layer and the negative electrode layer mainly contains aluminum and further contains 5 atm % of magnesium. A peak of the atomic concentration of magnesium is located at a position closer to the surface of the electrode layer than a peak of the atomic concentration of aluminum is.

The electrode layers of Comparative Sample 2 and Comparative Sample 3 have a thickness of 24.0 nm. A humidity resistance of the film capacitors of Comparative Sample 2 and Comparative Sample 3 is measured.

The humidity resistance is determined by a capacitance change rate (%) of the film capacitor after a voltage of 500 V is applied for 900 hours at a temperature of 85° C. at a humidity of 85% r.h. Capacitance C0 of the capacitor before the voltage is applied and capacitance Ct after the voltage is applied provide the capacitance change rate as (Ct−C0)/C0. As mentioned above, the smaller the capacitance change is, the higher the humidity resistance is.

The capacitance change rate of comparative sample 2 is −37.0% while the capacitance change rate of comparative sample 3 is −15.5%. Thus, the film capacitor of Comparative Sample 3 containing magnesium in the electrode layer has a higher humidity resistance than Comparative Sample 2 including the electrode layers made of aluminum alone.

A reason for the above will be explained below. Magnesium has a higher ionization tendency than aluminum, and therefore, forms an oxide film more quickly than aluminum. The oxide film has passivity suppressing oxide-degradation of a layer of zinc and a layer of aluminum covered with the oxide film. Magnesium contained in the electrode layer in, e.g. Comparative Sample 3 easily form the passive film, suppressing the change in the capacitance and increasing the humidity resistance.

Zinc has a lower ionization tendency than aluminum, and is hardly oxidized, not forming the passive film, therefore having a lower humidity resistance than aluminum. Electrode layers 3 and 4 of film capacitor 1 of Example 1 contain zinc. However, since the layer of magnesium is formed on the zinc layer, the magnesium prevents electrodes 3 and 4 from being oxidized and degraded, thus increasing the humidity resistance.

Electrode layers 3 and 4 shown in Table 1 having a low resistance not larger than 3Ω/□ have a large thickness. In this case, even if electrodes 3 and 4 are oxidized and degraded, large portions of electrodes 3 and 4 functioning as electrodes 3 and 4 for flowing currents remain, accordingly decreasing the change in capacitance. Electrode layers 3 and 4 having a high resistance not smaller than 50Ω/□ have extremely small thicknesses. In this case, since each electrode layer contains a small amount of magnesium, the electrode layer has a small effect of preventing oxidative degradation.

As described above, Example 1 has a higher humidity resistance than Comparative Sample 1 particularly in the case that the resistance of the electrode layer is within a range not smaller than 5Ω/□ and not larger than 30Ω/□.

Table 2 shows a potential gradient between electrodes 3 and 4 and a humidity resistance of Example 1 compared with the comparative sample. The humidity resistance is determined similarly to that shown in Table 1. The potential gradient is obtained by dividing an applied voltage (V) by a thickness (μm) of dielectric films 2 and 7. In Table 2, a sample having a higher humidity resistance than Comparative Sample 1 is denoted by "+", and a sample having almost the same humidity resistance as Comparative Sample 1 is dented by "±".

TABLE 2

| Potential Gradient (V/µm) | 100 | 150 | 300 | 600 |
|---|---|---|---|---|
| Humidity of Example 1 | ± | + | + | ± |

The range of the potential gradient of the capacitor not smaller than 150 V/µm provides Example 1 with a superior effect of improving humidity resistance comparing to Comparative Sample 1. Since the range of the potential gradient not larger than 100 V/µm does not exhibit oxidative degradation, electrode layers 3 and 4 of Example 1 can be effectively employed in the case that the potential gradient is not smaller than 150 V/µm.

In Example 1, since low-resistant portions 10 and 11 contain zinc having a low melting point, low-resistant portions 10 and 11 reduce tan δ of film capacitor 1. The melting point of zinc is 419.5° C. The melting point of aluminum is about 660° C. The melting point of magnesium is about 650° C. Electrode layers 3 and 4 include low-resistant portions 10 and 11 which are locally-thick layers of zinc, respectively. During a process of spraying zinc to form end-surface electrodes 5 and 6, the sprayed zinc softens low-resistant portions 10 and 11, and allows end-surface electrodes 5 and 6 to adhere securely to electrode layers 3 and 4, respectively, hence reducing a resistance and tan δ of film capacitor 1.

In Example 1, electrode layers 3 and 4 mainly containing aluminum maintain a high self-healing property of film capacitor 1. Since aluminum has a smaller resistance than zinc and magnesium, aluminum as a main material allows the electrode layers to have a small thickness allowing the electrode layers to be easily dispersed, thus enhancing the self-healing property.

In Example 1, peak p3 of the atomic concentration of aluminum of the electrode layer is located at a position deeper than peak p2 of the atomic concentration of zinc of the electrode layer. That is, in direction 1D, peak p3 of the atomic concentration of aluminum in electrode layer 3 is father away from the upper surface of electrode layer 3 than peak p2 of the atomic concentration of zinc in electrode layer 3 is. Peak p3 of the atomic concentration of aluminum in electrode layer 4 is father away from the upper surface of electrode layer 4 than peak p2 of the atomic concentration of zinc in electrode layer 4 is. Upon the aluminum being dispersed, this configuration allows zinc to be dispersed easily, enhancing the self-healing property.

As described above, capacitor element 500 includes dielectric film 2 and a pair of electrode layers 3 and 4 facing each other across dielectric film 2. A pair of end-surface electrodes 5 and 6 is formed at both ends of capacitor element 500. At least one electrode layer 3 (4) of the pair of electrode layers 3 and 4 mainly contains aluminum and further contains zinc and magnesium. The peak of the atomic concentration of magnesium of electrode layer 3 (4) is closer to the surface of electrode layer 3 (4) than the peak of the atomic concentration of zinc of electrode layer 3 (4) is.

EXAMPLE 2

Example 2 of film capacitor 1 is different from example 1 in the distribution of magnesium in electrode layers 3 and 4 of film capacitor 1.

In example 2, a ratio of an atomic concentration of magnesium in positive electro layer 3 to an atomic concentration of aluminum in positive electro layer 3 is higher at center region 14C extending from end 14 in effective electrode portion 12 than at end 14 where low-resistant portion 10 of positive electro layer 3 is formed, i.e., than at end 14 facing end-surface electrode 5. Center region 14C includes center 1C. Similarly, the ratio of the atomic concentration of magnesium in negative electrode layer 4 to the atomic concentration of aluminum in negative electrode layer 4 is higher at center region 15C extending from end 15 of effective electrode portion 13 than at end 15 where low-resistant portion 11 of negative electrode layer 4 is formed, i.e., than at end 14 facing end-surface electrode 6. Center region 15C includes center 1C.

The ratio of the atomic concentration of aluminum to the atomic concentration of magnesium ranges from 99.5/0.5 to 95/45. A concentration gradient within the above range is provided between end 14 and effective electrode portion 12 and between end 15 and effective resistance 13. This configuration enhances the effect of magnesium improving the humidity resistance.

The ratio of the atomic concentration of zinc to the atomic concentration of aluminum in positive electrode layer 3 gradually decreases from end 14 toward end 28 while the ratio of the atomic concentration of zinc to the atomic concentration of aluminum in negative electrode layer 4 gradually decreases from end 15 toward end 29. The ratio of the atomic concentration of zinc to the atomic concentration of aluminum is higher at ends 14 and 15 than at center regions 14C and 15C of electrode layers 3 and 4, respectively.

Table 3 shows a humidity resistance determined by a capacitance change rate for various values of the atomic concentration of aluminum and that of magnesium. Each atomic concentration shown in Table 3 is an average of the atomic concentration in each of entire positive electrode layer 3 and entire negative electrode layer 4.

In Table 3, a capacitance change of a sample having a ratio of 100/0 of the atomic concentration of aluminum to the atomic concentration of magnesium is qualified as a reference. A sample suppressing the capacitance change to a value not smaller than 5% and smaller than 10% of the reference is denoted by "+". A sample suppressing the capacitance change to a value not smaller than 10% and smaller than 20% of the reference is denoted by "++". A sample suppressing the capacitance change to a value not smaller than 20% of the reference is denoted by "+++". A method of measuring the capacitance change rate is identical to that of Example 1, and the rate of capacitance change is measured after a voltage of 500 V is applied for 900 hours at a high temperature of 85° C. and a high humidity of 85% r.h.

TABLE 3

| Ratio of Atomic Concentration of Aluminum to Atomic Concentration of Magnesium | Humidity Resistance |
|---|---|
| 100/0 | (reference) |
| 99.5/0.5 | ++ |
| 95/5 | +++ |
| 85/15 | +++ |
| 75/25 | ++ |
| 55/45 | + |

As shown in Table 3, an amount of magnesium having the ratio of atomic concentration of aluminum to the atomic concentration of magnesium larger than 99.5/0.5 increases the humidity resistance. The amount of magnesium having the ratio exceeding 55/45 causes the humidity resistance to reach a peak. Thus, the ratio of the atomic concentration of aluminum to the atomic concentration of magnesium ranging from 99.5/0.5 to 55/45 effectively allows magnesium to efficiently improve the humidity resistance.

In Example 2, since the concentration of magnesium in effective electrode portions 12 and 13 is higher than in low-resistant portions 10 and 11, the humidity resistance of effective electrode portions 12 and 13 forming to the capacitance of the capacitor is much effectively increased, As described above, electrode layer 3 (4) has end 14 (15) connected to one end-surface electrode 5 (6) of the pair of end-surface electrodes 5 and 6 and has center region 14C (15C) extending away from end 14 (15). The ratio of the atomic concentration of magnesium to the atomic concentration of aluminum in end 14 (15) may be smaller than the ratio of the atomic concentration of magnesium to the atomic concentration of aluminum in center region 14C (15C).

The ratio of the atomic concentration of zinc to that of aluminum in end 14 (15) may be higher than the ratio of the atomic concentration of zinc to that of aluminum in center region 14C (15C).

Electrode layer 3 (4) further has end 28 (29) opposite to end 14 (15). In electrode layer 3 (4), the ratio of the atomic concentration of zinc to the atomic concentration of aluminum may gradually decrease from end 14 (15) toward end 28 (29).

EXAMPLE 3

Example 3 is different from Example 1 in the distribution of magnesium.

In positive electrode layer 3 and negative electrode layer 4 of Example 3, a peak of an atomic concentration of magnesium in positive electrode 3 is located in large electrode portion 16 of positive electrode layer 3 in width directions 1A and 1B of dielectric film 2 while the peak of the atomic concentration of magnesium in negative electrode layer 4 is located in large electrode portion 17 of negative electrode layer 4 in width directions 1A and 1B of dielectric film 7.

Figure 5:
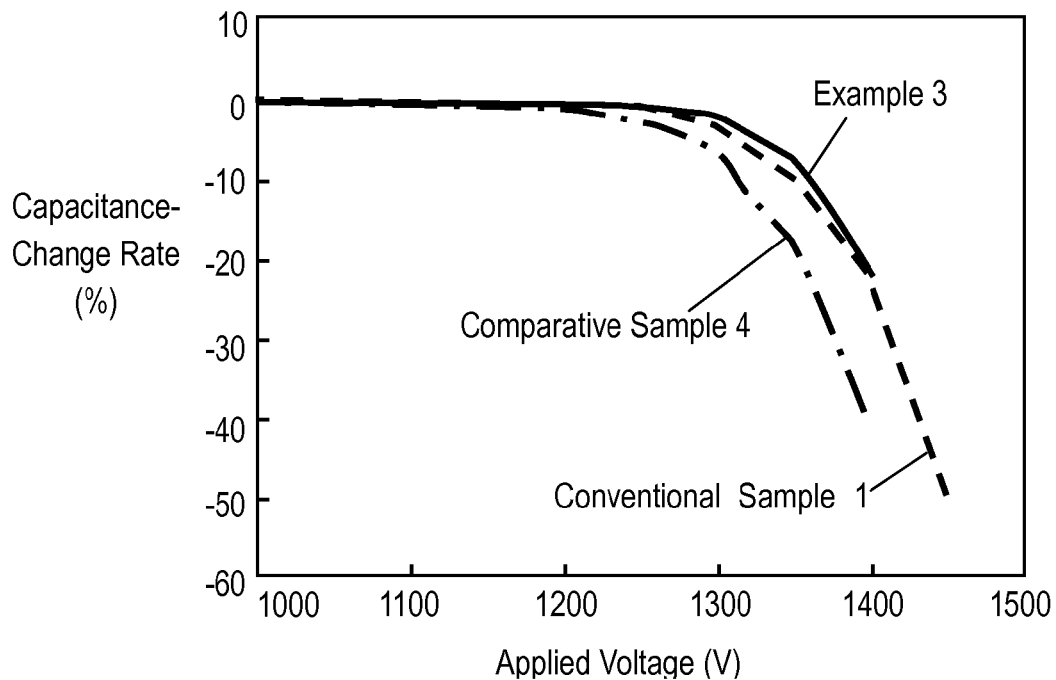
FIG. 5 shows test results of a withstand voltage test of the film capacitor according to the embodiment.
Figure 6:
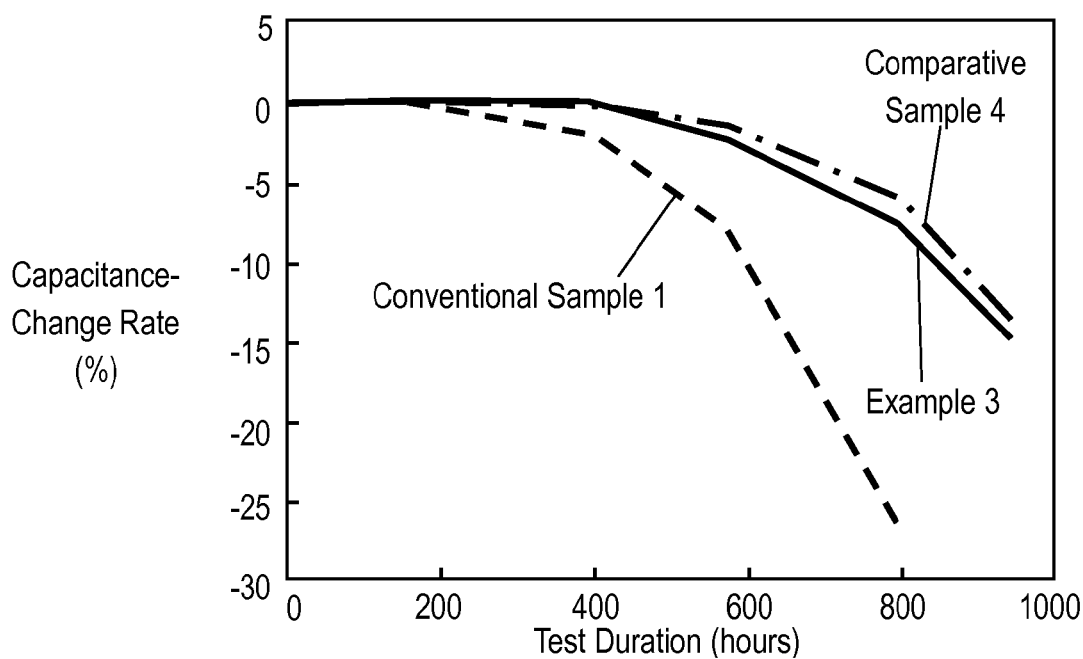
FIG. 6 shows humidity resistance test results of the film capacitor according to the embodiment.
Figure 7:
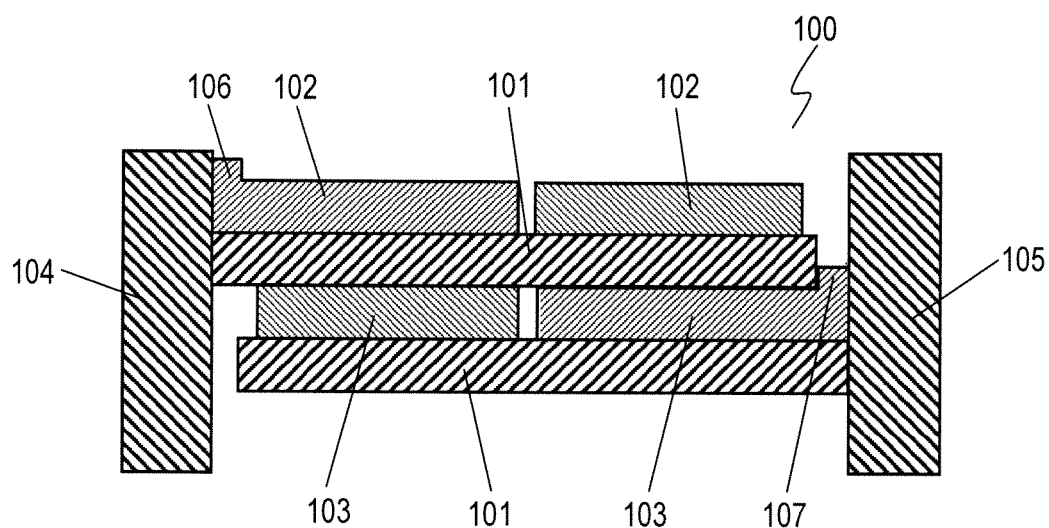
FIG. 7 is a schematic cross-sectional view of a conventional film capacitor.

A short-time withstand voltage test and a humidity resistance test are conducted with the film capacitor of Example 3. FIGS. 5 and 6 show the test results of the short-time withstand voltage test and the humidity resistance test conducted with Example 3.

Conventional Sample 1 shown in FIGS. 5 and 6 is a film capacitor employing a conventional metallized film including a positive electrode layer and a negative electrode layer made of only a layer of aluminum. In Comparative Sample 4, the positive electrode layer and the negative electrode layer mainly contain aluminum and further contain magnesium. Comparative Sample 4 is a film capacitor employing a metallized film in which a peak of the atomic concentration of magnesium is located in the small divided electrode portion in each of the positive electrode layer and the negative electrode layer.

In the short-time withstand voltage test, a voltage at which a capacitance change rate becomes −5% is defined as the withstand voltage of the capacitor. In the short-time withstand voltage test, the capacitance change rate is measured by raising a test voltage by a predetermined voltage at a predetermined interval under an atmosphere of 100° C. to find the withstand voltage of the capacitor.

In the humidity resistance test, the humidity resistance is evaluated based on a duration for causing the capacitance change rate to become −5%. To obtain the capacitance change rate, a voltage of 650 V is continually applied to samples under a high temperature of 85° C. and a high humidity 85% r.h. Then, the capacitance change rate is then measured, and the duration for which the capacitance change rate becomes −5% is measured.

Table 4 shows the evaluation results of the withstand voltage and the humidity resistance of the film capacitor of Example 3 obtained by the short-time withstand voltage test and the humidity resistance test. Withstand voltage Vt of each sample and withstand voltage V0 of Conventional Sample 1 provide the change rate of the withstand voltage of the sample calculated by (Vt−V0)/V0 shown in Table 4. In Table 4, a humidity resistance improving rate is calculated based on duration ht for which the capacitance change rate of the sample becomes −5% and duration h0 for which the capacitance change rate of the Conventional Sample 1 becomes −5% as ht/h0.

TABLE 4

|  | Withstand Voltage | Change Rate of Withstand Voltage | Humidity Resistance (hours) | Humidity Resistance Improving Rate |
| --- | --- | --- | --- | --- |
| Example 1 | 1334 | +1% | 687 | 1.4 times |
| Conventional Sample 1 | 1319 | (reference) | 487 | (reference) |
| Comparative Sample 4 | 1281 | −3% | 748 | 1.5 times |

As shown in Table 4, Comparative Sample 4 exhibits an improvement in humidity resistance 1.5 times higher than Conventional Sample 1, but withstand voltage is 3% lower than Conventional Sample 1. Example 3 exhibits a substantially same humidity resistance as Comparative Sample 4 and an improvement in humidity resistance 1.4 times higher than Conventional Sample 1. Regarding the withstand voltage, Example 3 exhibits a withstand voltage which is higher than that of Comparative Sample 4 and which is substantially identical to that of Conventional Sample 1.

In a film capacitor employing a vapor-deposited metal electrode made of alloy containing magnesium, the vapor-deposited metal electrode can be hardly vapored and dispersed. The electrode therefore hardly exhibit the self-heal property, hence degrading the self-healing property of the capacitor and decreasing the withstand voltage. The withstand voltage of the film capacitor is affected significantly by the self-healing property of small electrode portions 18 and 19. The peak of the atomic concentration of magnesium is located in large electrode portions 16 and 17, and the atomic concentration of magnesium in small electrode portions 18 and 19 is smaller than that of large electrode portions 16 and 17. This configuration maintains the self-healing property, and prevents the withstand voltage from decreasing.

The atomic concentration of magnesium in Example 3 and Comparative Sample 4 are measured by an X-ray fluorescence analysis (XRF). Specifically, plural pieces having a diameter of 10 mm are cut out from the metallized film in the width direction of the metallized film, and then, the magnesium concentration in each piece is measured. As a result, the peak of the concentration of magnesium is located in large electrode portions 16 and 17 in Example 3 while the peak of the concentration of magnesium is located in the small divided electrode portions in Comparative Sample 4.

An average of the concentration of magnesium in the plural pieces cut out from large electrode portions 16 and 17 of example 3 is higher than an average of the concentration of magnesium in the plural pieces cut out from small electrode portions 18 and 19.

In order to obtain an effective suppressing the decrease of the withstand voltage of the film capacitor, the concentration of magnesium in small electrode portions 18 and 19 affecting the withstand voltage of the film capacitor is smaller than in large electrode portions 16 and 17. The configuration of large electrode portions 16 and 17 is not restricted as long as it does not significantly affect the withstand voltage of the film capacitor. Each of large electrode portions 16 and 17 of Example 3 includes a single electrode uniformly extending in winding direction 1E (FIG. 2) in which films 2 and 7 are rolled, instead of plural electrode portions divided by the margins. This configuration is not restricted to it, and large electrode portions 16 and 17 may include plural electrode portions divided by the insulation margin into portions having a certain size. However, in the case that the withstand voltage of the film capacitor is affected by the self-healing property of large electrode portion 16 and 17, the effect of the film capacitor of Example 3 is obstructed. Therefore, large electrode portions 16 and 17 are larger than small electrode portions 18 and 19.

In Example 3, a boundary between large electrode portion 16 (17) and a group of small electrode portions 18 (19) in width directions 1A and 1B is substantial center 1C of effective electrode portion 12 (13), but this is not a restrictive condition.

Small electrode portions 18 and 19 have preferably a smaller thickness than large electrode portions 16 and 17. This configuration allows small electrode portions 18 and 19 to be easily dispersed, and enhances the self-healing property. The thickness of the portions may be measured by observing a cross section of electrode layers 3 and 4 with a transmission electron microscope and then averaging the measurements.

In Example 3, the peak of the atomic concentration of magnesium is located in large electrode portions 16 and 17 of positive electrode layer 3 and negative electrode layer 4. However, the peak of the atomic concentration of magnesium may be located in the large electrode portion of one of positive electrode layer 3 and negative electrode layer 4, and a peak of the atomic concentration of magnesium may be located in the small electrode portion of another one of positive electrode layer 3 and negative electrode layer 4.

As described above, electrode layer 3 (4) includes large electrode portion 16 (17) and small electrode portions 18 (19) smaller than the large electrode portion which are divided each other by the insulation portion (longitudinal margins 20 and 24) in width direction 1A along surface 3A (4A). The peak of the atomic concentration of magnesium of electrode layer 3 (4) in width direction 1A of dielectric film 2 may be located in large electrode portion 16 (17). Small electrode portion 18 (19) may be thinner than large electrode portion 16 (17).

In the embodiment, terms, such as "upper surface" and "lower surface", indicating directions merely indicate relative directions depending only on a relative positional relation of components, such as dielectric films 2 and 7 and electrode layers 3 and 4, of film capacitor 1, and do not indicate absolute directions, such as a vertical direction.

INDUSTRIAL APPLICABILITY

A film capacitor according to the present invention has a preferable humidity resistance, and is suitably employed in various electronic products, electrical apparatus, industrial equipment and automobiles. The capacitor is useful for the automotive fields requiring a high humidity resistance and a high withstand voltage.

REFERENCE MARKS IN THE DRAWINGS

1 Film Capacitor
2 Dielectric Film
3 Electrode Layer
4 Electrode Layer
5, 6 End-Surface Electrode
7 Dielectric Film
14, 15 End (First End)
14C, 15C Center Region
16, 17 Large Electrode Portion
18, 19 Small Electrode Portion
29, 24 Longitudinal Margin (Insulation Portion)
28, 19 End (Second End)

The invention claimed is:

1. A film capacitor comprising:
a capacitor element including a dielectric film and a pair of electrode layers facing each other across the dielectric film; and
a pair of end-surface electrodes provided on both ends of the capacitor element,
wherein at least one electrode layer of the pair of electrode layers mainly contains aluminum and further contains zinc and magnesium,
wherein a peak of an atomic concentration of magnesium of the at least one electrode layer is located at a position closer to a surface of the at least one electrode layer than a peak of an atomic concentration of zinc of the at least one electrode layer is.

2. The film capacitor according to claim 1,
wherein the at least one electrode layer has an end connected to one of the pair of end-surface electrodes and has a center region extending in a direction away from the end, and
wherein a ratio of an atomic concentration of magnesium at the end of the at least one electrode layer to an atomic concentration of aluminum at the end of the at least one electrode layer is lower than a ratio of an atomic concentration of magnesium at the center region of the at least one electrode layer to an atomic concentration of aluminum at the center region of the at least one electrode layer.

3. The film capacitor according to claim 1,
wherein the at least one electrode layer has a first end connected to one end-surface electrode of the pair of end-surface electrodes and has a center region in a direction extending away from the first end, and
wherein a ratio of an atomic concentration of zinc at the first end of the at least one electrode layer to an atomic concentration of aluminum at the first end of the at least one electrode layer is higher than a ratio of an atomic concentration of zinc at the center region of the at least one electrode layer to an atomic concentration of aluminum at the center region of the at least one electrode layer.

4. The film capacitor according to claim 3,
wherein the at least one electrode layer further has a second end opposite to the first end, and
wherein a ratio of an atomic concentration of zinc of the at least one electrode layer to an atomic concentration of aluminum of the at least one electrode layer gradually decreases from the first end of the at least one electrode layer toward the second end of the at least one electrode layer.

5. The film capacitor according to claim 1,
wherein the at least one electrode layer includes a large electrode portion and a small electrode portion smaller than the large electrode portion, the large electrode portion and the small electrode portion being separated by an insulation portion and being arranged in a width direction along the surface of the at least one electrode layer, and
wherein a peak of an atomic concentration of magnesium of the at least one electrode layer in the width direction is located in the large electrode portion.

6. The film capacitor according to claim 5, wherein the small electrode portion is thinner than the large electrode portion.

7. A film capacitor comprising:
a capacitor element including a dielectric film and a pair of electrode layers facing each other across the dielectric film; and
a pair of end-surface electrodes provided on both ends of the capacitor element,
wherein at least one electrode layer of the pair of electrode layers mainly contains aluminum and further contains magnesium,
wherein the at least one electrode layer has an end connected to one of the pair of end-surface electrodes and has a center region extending in a direction away from the end
wherein a ratio of an atomic concentration of magnesium at the end of the at least one electrode layer to an atomic concentration of aluminum at the end of the at least one electrode layer is lower than a ratio of an atomic concentration of magnesium at the center region of the at least one electrode layer to an atomic concentration of aluminum at the center region of the at least one electrode layer.

8. A film capacitor comprising:
a capacitor element including a dielectric film and a pair of electrode layers facing each other across the dielectric film; and
a pair of end-surface electrodes provided on both ends of the capacitor element,
wherein at least one electrode layer of the pair of electrode layers mainly contains aluminum and further contains magnesium,
wherein the at least one electrode layer includes a large electrode portion and a small electrode portion smaller than the large electrode portion, the large electrode portion and the small electrode portion being separated by an insulation portion and being arranged in a width direction along the surface of the at least one electrode layer, and
wherein a peak of an atomic concentration of magnesium of the at least one electrode layer in the width direction is located in the large electrode portion.

9. A film capacitor comprising:
a capacitor element including a dielectric film and a pair of electrode layers facing each other across the dielectric film; and
a pair of end-surface electrodes provided on both ends of the capacitor element,
wherein at least one electrode layer of the pair of electrode layers mainly contains aluminum and further contains magnesium,
wherein the at least one electrode layer includes a large electrode portion and a small electrode portion smaller than the large electrode portion, the large electrode portion and the small electrode portion being separated by an insulation portion and being arranged in a width direction along the surface of the at least one electrode layer, and
wherein an average of an atomic concentration of magnesium of the large electrode portion is higher than an average of an atomic concentration of magnesium of the small electrode portion.

* * * * *